(12) United States Patent
Hudson et al.

(10) Patent No.: US 7,199,911 B2
(45) Date of Patent: Apr. 3, 2007

(54) OPTICAL STRUCTURE

(75) Inventors: Philip Hudson, Andover (GB); John Drinkwater, Andover (GB)

(73) Assignee: Optaglio Ltd., Swindon (GB)

( * ) Notice: Subject to any disclaimer, the term of this patent is extended or adjusted under 35 U.S.C. 154(b) by 0 days.

(21) Appl. No.: 10/312,121

(22) PCT Filed: Jul. 2, 2001

(86) PCT No.: PCT/GB01/02965

§ 371 (c)(1),
(2), (4) Date: Apr. 7, 2003

(87) PCT Pub. No.: WO02/03104

PCT Pub. Date: Jan. 10, 2002

(65) Prior Publication Data

US 2003/0161017 A1    Aug. 28, 2003

(30) Foreign Application Priority Data

Jul. 3, 2000   (GB) .................................. 0016356.8

(51) Int. Cl.
*G03H 1/00* (2006.01)
(52) U.S. Cl. ............................ 359/2; 359/567; 430/10; 283/86
(58) Field of Classification Search .................. 359/2, 359/566–567, 577; 283/86; 430/10
See application file for complete search history.

(56) References Cited

U.S. PATENT DOCUMENTS

| 4,206,965 A | 6/1980 | McGrew |
| 4,544,266 A | 10/1985 | Antes |
| 4,568,141 A | 2/1986 | Antes |
| 4,576,439 A | 3/1986 | Gale et al. |
| 4,629,282 A | 12/1986 | McGrew |
| 5,101,184 A | 3/1992 | Antes |
| 5,138,471 A | 8/1992 | McGrew |
| 5,461,239 A | 10/1995 | Atherton |

(Continued)

FOREIGN PATENT DOCUMENTS

DE    38 40 037 A1    5/1990

(Continued)

OTHER PUBLICATIONS

Burckhardt, C.B., "Display of Holograms in White Light", The Bell System Technical Journal, Dec. 1966, pp. 1841-1844.

(Continued)

*Primary Examiner*—Leonidas Boutsikaris
(74) *Attorney, Agent, or Firm*—Townsend and Townsend and Crew LLP

(57) ABSTRACT

An optical device for security and anti-counterfeit applications has a holographic diffractive structure that includes a discrete region that in response to white light illumination generates a holographic image by a process of diffraction of light in one embodiment combined with a paper substrate which also contains a secure mark produced by laser ablation of the structure, the mark being characterised by various attributes: variable cut width and pattern, being visible both in reflected light and also in transmitted light, variable depth of cut, variable perforation visible in transmission, variable reflection characteristics. In one embodiment when combined with paper based laser mark has elements in both metallised diffractive region and paper region, the marks on different regions showing different characteristics and thereby securely linking diffractive structure and paper substrate and also showing different characteristics of marking pattern on the different materials.

41 Claims, 3 Drawing Sheets

U.S. PATENT DOCUMENTS

| | | | |
|---|---|---|---|
| 5,483,363 A | 1/1996 | Holmes et al. | |
| 5,513,019 A | 4/1996 | Cueli | |
| 5,582,434 A | 12/1996 | Skov et al. | |
| 5,658,411 A | 8/1997 | Faykish | |
| 5,659,408 A | 8/1997 | Wenyon | |
| 5,694,229 A | 12/1997 | Drinkwater et al. | |
| 5,825,475 A | 10/1998 | Formosa | |
| 5,971,277 A | 10/1999 | Cragun et al. | |
| 6,088,161 A | 7/2000 | Lee | |
| 6,157,474 A | 12/2000 | Orr et al. | |
| 6,337,752 B1* | 1/2002 | Heckenkamp et al. | 359/2 |
| 6,372,394 B1* | 4/2002 | Zientek | 430/10 |
| 6,414,761 B1* | 7/2002 | Stepanek | 359/2 |

FOREIGN PATENT DOCUMENTS

| | | |
|---|---|---|
| DE | 196 12 819 A1 | 10/1997 |
| EP | 0 651 365 A1 | 5/1995 |
| EP | 0 919 961 A2 | 6/1999 |
| EP | WO 99/36271 * | 7/1999 |
| GB | 2 149 532 A | 6/1985 |
| GB | 2 243 139 A | 10/1991 |
| WO | WO 93 18419 A1 | 9/1993 |
| WO | WO 94 24615 A1 | 10/1994 |
| WO | WO 95 02200 A1 | 1/1995 |
| WO | WO 95 34008 A1 | 12/1995 |
| WO | WO 98 08691 A1 | 3/1998 |
| WO | WO 99 04364 A1 | 1/1999 |
| WO | WO 99 59036 A1 | 11/1999 |
| WO | WO 00 30043 A1 | 5/2000 |

OTHER PUBLICATIONS

Hariharan, P., "Colour Holography", *E. Wolf, Progress in Optics Volume XX*, p. 265-324, North-Holland, 1983, Oxford, Amsterdam New York, US.

Tedesco, James M., "Holographic Diffusers for LCD Cockpit Displays", Proceedings of the SPIE, SPIE, 1994, vol. 2219, pp. 327-337, Bellingham, VA, US.

* cited by examiner (2A)  (2B)  (2C)

OPTICAL STRUCTURE

Optically variable diffractive devices such as holograms and optical interference based devices are now used to prove the authenticity of items of value and to prevent their fraudulent duplication for example for banknotes, plastic cards, value documents such as fiscal stamps, travel documents such as passports and for the authentication of valuable goods as an anti-counterfeit measure.

This invention relates to a potentially unique and indelible marking and numbering device and method and particularly applicable to the indelible marking of such optically variable diffractive devices particularly useful in the area of anti-counterfeit and authentication.

Devices based on the principle of optical diffraction are often used for anti-counterfeit and security purposes because they can produce, by the process of optical diffraction, an optically variable image with characteristic features such as depth and parallax (holograms) and movement features and image switches (purely diffraction grating devices and some holographic devices). Such diffractive, optically variable image forming devices are used as anti-counterfeit devices both because their effects are highly recognisable and cannot be duplicated by print technologies, and because specific and difficult to replicate optical and engineering techniques are required for their production.

These diffractive optically variable image forming devices form their effects base on holographic or pure diffraction grating techniques and are often manufactured as embossed surface relief structures as known in the art (e.g. Graham Saxby, "Practical Holography" Prentice Hall 1988). They are typically applied to documents of value, plastic cards and articles of value to be protected in the form of holographic or diffractive hot stamping foil or holographic or diffractive labelling, often tamper evident, the labelling being constructed usually of a plastic base or of hot stamping foil applied to a paper base using the known method from the printing industry of the technique of hot stamping of decorative foils.

These are various forms of pure diffraction grating devices in use as such security devices, examples include U.S. Pat. No. 4,568,141, which reveals a diffraction optical authenticating element and U.S. Pat. No. 5,034,003 which reveals another form of optical security device using diffraction gratings. Another form of pure diffraction grating security device can be produced by direct writing by an electron beam—examples are WO 9318419, WO 9504948 and WO 9502200. Diffractive optical variable image forming device are also produced by holographic methods and known by their use in security applications for example on credit cards, secure documents and product authentication. Examples of teachings on holographic optical security structures are U.S. Pat. Nos. 5,694,229, 5,483,363, WO 9959036.

One of the limitations on embossed hologram of diffractive structure production is that each item is inevitably identical having been produced from one master image or shim which is replicated many times. In the security field it is usually an advantage to ensure that all public recognition security devices are as near identical as possible to aid public recognition. However, for many applications in the security field it is extremely useful to have the image identified, potentially uniquely or by batch or type, with for example alpha-numeric indicia, numbers or some other form of image. It is also often very useful to have additional variable data carried by the label. In both these cases it is useful if the variable data is itself secure against alteration and also is applied and has a unique and secure form to aid both in identification and security against alteration or counterfeit and reproduction.

Currently various approaches have been used for product and document security. These include security labelling using anti-counterfeit features such as holograms, diffractive devices, threads or various forms of security print to add an authentication mark to a document of value or an authentication label to the goods each mark containing a difficult to counterfeit public recognition optical security device. Examples of such optical diffractive features are known in the art and by usage and are detailed below.

It is often advantageous and known in the art to uniquely or variably mark holographic or diffractive optical security devices, which is usually done via overprint techniques currently using for example inkjet marking. One of the problems with this type of variable marking is that it generally can be removed without damaging the underlying label base (as there is generally no physical change induced in the OVD) and is usually easy to reproduce. It therefore provides an audit trail but is not especially visually unique or secure against alteration.

However, these systems suffer disadvantages. First, the marking systems in use currently are of the printed form, usually overprint in the form of classical print or more usually inkjet marking or possibly thermal printing, and such marking systems are easy to counterfeit and duplicate with print of an almost indistinguishable quality. Such marking systems are also usually not indelible and many inks, for example inkjet printing ink, can straightforwardly be removed from the generally plastic substrates involved as they often have poor adhesion and wear resistance on these surfaces. As these ink marks have not permanently altered the often plastic or resin substrate of the typical optical diffractive device such as an embossed plastic label, lacquer or hot stamping foil lacquer the ink removal often leaves little trace and allows straight-forward re-use and alteration. Also due to the wide-spread knowledge and usage of print technology this form of unique marking offers much less security than the secure diffractive device itself as the print does not indelibly mark the diffractive substrate and can often be removed or altered in a relatively straight forward way. This is particularly true for the area of unique numbering where the print technology to number is often of lower quality and easier for a counterfeiter to reproduce because it is driven by a need to mark each item individually, an encumbrance not hampering the counterfeiter.

There is therefore a clear need for an improved marking method for such diffractive devices that is both indelible and has a overt and covert characteristics that are extremely difficult to replicate whilst retaining a unique numbering capability so providing a security signature and is therefore very difficult to counterfeit.

There are also now many applications where it is desirable not just to securitise an article with a hologram or diffractive device but to ensure each diffractive device is individually ( or batch ) unique. This capability can be provided using reflection type holography where each holographic exposure is made uniquely to an object beam, but this method is prohibitively slow and uses expensive materials. Most diffractive devices sold into security applications are manufactured by an embossing process, where numerous identical impressions are taken form the same master. Such diffractive devices today would normally be uniquely securitised by overprinting conventionally with a unique number or code or similar. Due to the wide-spread knowledge and usage of print technology this form of unique marking offers much less security than the secure diffractive device itself as the print does not indelibly mark the diffractive substrate and can often be removed or altered in a relatively straight forward way. Print based techniques can now with current desk top computer based publishing and scanning technology straight-forwardly be scanned and colour copied for reproduction.

Thus a unique marking and numbering system that can indelibly and uniquely mark a diffractive device in a way that both cannot be removed and has unique characteristics in the mark would be very useful in this field.

In other applications diffractive devices are often applied to paper base stock in the form of hot stamping foil or possibly plastic labels. In some instances this could be to securitise a paper based security label or document of value to safeguard the information on this. It is often useful to tie the diffractive optical security device in with the paper base stock and in these instances there is a known practice to run a print pattern continuously on both the paper base and the diffractive device to make remove, alteration and re-use more difficult. Particular examples of this can be found in the banknote and security document field where for example holographic or diffractive foil stripes are sometimes overprinted with the overprint covering both foil and paper to protect against removal. This technique can also be seen on certain foil patch applications, for example in the banknote field, where print is run over both paper and foil patch to make alteration more difficult, however, because the securitisation is print based it is subject to reproduction, scanning and is also not indelible. In these areas it would be particularly helpful if the marking on the foil could be indelible and also of a particular and unique form with its own security 'signature' and characteristics. In these cases the marking may be used for unique marking or numbering but may also be used for securitising the document or foil.

Laser evaporation of material has previously been used in the packaging industry for scoring packaging material to aid in subsequent folding of material for carton manufacturing. Also other known techniques refer to laser application for perforating material and marking plastic cards. These teachings do not anticipate individual numbering and combined reflective and transmissive coding by scoring and perforation, do not anticipate security applications and do not anticipate periodically and characteristically varying the laser power and cut rate to provide a microscopic security signature encoding the mark.

An object of this invention is to provide an improvement upon the above devices in particular to incorporate completely secure and characteristic indelible unique data within a holographic security label without degrading the visual security diffractive image but with inspection and immediate confirmation of genuineness of the data straightforward. This new security device thus provides a potentially unique and indelible marking and numbering device and method and particularly applicable to the indelible marking of such optically variable diffractive devices particularly useful in the area of anti-counterfeit and authentication.

Accordingly, the current invention seeks to provide an optical structure having advantages over known such devices.

According to a first aspect of the invention there is an optical structure comprising a substratum having an optically variable portion and at least one graphical indicia inscribed at least in the surface of the substratum and wherein the optically variable portion and the at least one inscribed graphical indicia are arranged to offer a first optically variable image and a second inscribed reflective image visible via reflected light.

According to a second aspect of the invention there is an optical structure comprising a substratum, at least one graphical indicia inscribed at least in the surface of the substratum and having at least one transmissive graphical indicia formed in the substratum wherein the at least one inscribed graphical indicia is arranged to offer a first image visible via reflected light and the at least one transmissive graphical indicia is arranged to offer a second image via light transmitted through the structure.

According to another aspect of the invention there is a method of forming an optical structure comprising the steps of applying an optically variable device to a portion of a substratum and inscribing at least one graphical indicia at least in the surface of the substratum wherein the optically variable device and the inscribed graphical indicia are arranged to offer first and second images visible via reflected light.

According to yet another aspect of the invention there is a method of forming an optical structure comprising a substratum and including the steps of inscribing at least one graphical indicia at least in the surface of the substratum so as to offer a first image visible via reflected light and forming a transmissive graphical indicia in the substratum so as to offer a second image via light transmitted through the structure.

In the technique and method of this invention, when a laser beam of sufficient intensity interacts with a film material, the film material can be heated up sufficiently to locally evaporate in the interaction region. If the laser beam and material can be moved relative to each other then the material can be cut through or partially cut through to provide a score line. The rate of local evaporation of the material at any point will be a function of the laser power and spot size (local intensity delivery), the rate of movement of laser beam across material due to relative motion and the material type. If a laser beam is set to scan across a material by either keeping material stationary and scanning laser in two dimensions or by moving material and scanning laser in one direction then a cut or score pattern can be produced.

This invention refers to a new security device and manufacturing method for the same consisting of a diffractive optical security device indelibly and potentially uniquely marked in a characteristic way using laser ablation and vaporisation of material such that each device becomes unique if so required and contains a combination of diffractive element and unique indelible mark such as to make alteration and counterfeit very difficult. Such improved form of optical security device for use in the protection of documents and articles of value from counterfeit to verify authenticity. Such devices are often of the form of labels, either plastic or hot stamping foil applied to a paper base. This invention particularly relates to an improved method for indelibly and securely marking such devices, potentially such that each can be unique, the marking method being such that the marking is non alterable, visually unique and the marking can additionally contain other overt and covert security features.

In this invention there is described a new way of marking items (potentially individually), preferably metallised optically variable diffractive security devices such as holograms and kinegrams, where a laser marking technique is used to provide a marking that is itself indelible and completely not removable as it involves a permanent alteration of the plastic film, and where the marked image can be visually unique in both reflection and optionally transmission with the capability to carry different information within the reflected or transmitted images. Additionally this new marking technique has the capability for unique numbering or coding and has the capability to carry a security finger-print in the line structure and optionally this can contain a individual code or finger-print that can be made characteristic of the device or application stored within the line or image structure.

This invention forms a new type of security device distinct from previous work as that variations in the laser cut rate are used to provide a new type of security signature formed by permanently marking a diffractive device which is visible both in reflection as one mark, potentially visible in transmission as another mark or message to provide a second layer of security and potentially containing a covert signature or code carried within repetitive and periodically repeating small variations in the marking form and line width and perforation size and style caused by repetitively altering the laser cut rate in a periodic fashion. This therefore forms a new type of variably marked optical security device. This is very usefully combined with a diffractive metallised device which cannot be replicated easily and where the marking is indelible due to material removal and therefore secure against alteration. This invention is also new in that the continuous programmability of the laser cut pattern enables each item to receive a unique mark but with a constant and chosen signature and thus provides a significant advance in unique marking technology particularly useful as a means of consecutive numbering to uniquely and indelibly individually mark items.

This invention thus provides a unique mark and number that indelibly and uniquely marks a diffractive device in a way that both cannot be removed and has several unique characteristics in the mark which are very useful in this field for authentication both on an overt and covert microscopic level. This invention thus satisfies a need by providing an improved marking method for diffractive devices that is both indelible and has a overt and covert characteristics that are extremely difficult to replicate whilst retaining a unique numbering capability plus so providing a overt or covert security signature and is therefore a unique marking method that would be extremely difficult to counterfeit.

In this invention a laser beam is used to variably remove material from the substrate surface by an ablation and vaporisation process. The laser beam is typically scanned across the substrate to mark it, the depth of material vaporised depending on the laser intensity and scan speed the combination of which controls the depth of cut and also the substrate. Thus by adjusting laser scan speed and power for any particular substrate the depth and width of cut can be adjusted from surface marking through to perforation. The depth of cut also varies with substrate, so for example, the same conditions will produce different cut profiles on paper of various grades, metallised plastics such as embossed holograms and metallised hot stamping foils applied to paper.

In the case of hot stamped foil the laser marking can be used to remove the metal layer of the foil by laser vaporisation to reveal the underlying paper substrate—this forms of laser ablation demetallisation is a particularly useful method of indelible marking the diffractive device that cannot be altered and is as resistant as the device itself to abrasion. Because the mark is made by permanent removal of areas of the diffractive device and its associated metal reflective layer then this marking is completely indelible and resistant to alteration. Another useful attribute is where by small increases in the laser power in addition to removing the diffractive structure the laser can perforate completely through small areas of the underlying paper substrate also. This gives a particularly characteristic form of marking visible in both reflected light from the document and transmitted light through the document.

A particularly useful property of this technique is to use variations in laser wavelength used for marking in combination with different material properties (particularly light absorption at different wavelengths) to produce different physical characteristics in the markings.

For example, the use of a carbon dioxide laser with plastic embossed diffractive labels results in a mark burnt into both the underlying metal and the surface of the substrate as the plastic absorbs strongly at this wavelength (in this case 10.6 micron, other similar laser wavelengths could alternatively be used). This produces a characteristic undulation in the substrate in the region of the mark where the plastic has been vaporised to give not only a visible mark but also a recognisable tactile effect characterising the mark, adding a further identifying feature and test of authenticity to the mark. This tactile effect is highly recognisable and can be used to provide additional security for these marks. Such effects can also be produced in thick paper substrates. This technique can be extended to provide not only a visual mark in combination a tactile effect by using repetition of such marks superimposed optical reflection change effects can also be produced due to local changes in the surface slope and topography to produce additional reflective messaging.

So in a typical structure, perhaps consisting of a hot stamped hologram on a paper substrate or more preferably consisting of a embossed plastic diffractive structure presented on a label base the device could present an inscribed reflective image to an observer visible in reflective light which possesses additionally a surface undulation pattern providing a characteristic tactile effect for an observer holding the device and typically feeling the reflective security marking by running a finger over the area to feel the tactile nature of the marking. This would make counterfeit of these structures additionally difficult and would be particularly useful for unique numbering applications making this form of marking extremely difficult to reproduce by other means. Further more the surface undulation pattern corresponding to the second inscribed reflective image can additionally produce an additional security image visible in grazing incidence reflected light. This can be achieved by inscribing, for example, a set of parallel lines in certain areas or by inscribing sets of lines of variable depths to change the average slope angle of the surface in that area to produce an effect visible by grazing incidence.

Also the nature of the tactile effect can be altered between applications and between ostensibly identical styles of inscribed reflective indicia (font styles) to change the effect and add further security.

In another example of this another laser wavelength could be used that is absorbed by the typically aluminium reflective layer used with an embossed diffractive structure, but not absorbed by the plastic carrier. A suitable laser for this would be a Nd-Yag laser operating at 1 micron (or a laser operating at a similar wavelength). In this case the metal reflector would be vaporised without leaving any mark on the plastic surface which would be undamaged. The advantage of this over prior methods as this number or mark could be applied late in the production process yet still leaving the top carrier layer undamaged, whereas to achieve this effect with conventional techniques would involve numbering the article and removal of material prior to adhesive coating and finishing which would be much less efficient especially with unique marking and numbering due to the wastage generated later in the process.

A particularly useful embodiment of this invention is where the laser scans producing numbers or codes using a particular (possibly customised) font style—in this case with the appropriate power adjustment the marking can be made to vary between metal removal and complete perforation depending on the shape of font style determining write and re-write speeds and hence dwell time on any particular spot and hence depth of cut or perforation which then becomes a characteristic repetitive 'security signature' for that combination of font, write speed, diffractive foil and paper substrate.

A particularly useful embodiment is where unique numbering is carried out using a custom font designed to give, for example, a particular periodically repeating perforation pattern and/or a particular periodically repeating variation in cut pattern, for example by varying the cutting depth and line width repetitively along the font line to provide a 'security signature' within the reflected image on a microscopic scale by line width analysis and also to change visually the pattern of marking line. It can also be appreciated that small, repetitive breaks in the marking line, etc can also be introduced as part of this process, although a preferred and more subtle technique would be to use line width and cutting depth variation.

An alternative method, not preferred but part of this invention, would be to write a number or pattern and then rewrite certain areas to induce additional depth of ablation to perforate or additionally mark.

It can also be appreciated that this variable perforation technique can also be applied to diffractive optical security devices in the form of stand alone plastic labels.

This type of ablative marking is particularly suitable when applied to diffractive optical devices, such as holograms and other diffractive devices, the indelible marking of which forms the preferred embodiment of the invention and major application. This is because this marking technique permanently destroys part of the optical microstructure in addition to removing by ablation the metal reflective layer thus rendering the mark on the microstructure completely permanent.

A particularly useful combination for security labelling applications is a label consisting of a paper base and a hot stamped hologram or diffractive foil either applied as a patch or stripe and here a particularly useful combination is where the laser mark, such as a unique number, runs across both foil and paper areas producing different effects on each and forming a very secure way of evidencing tamper. A particularly useful embodiment is where the laser marking partially perforates several areas and where the laser marking line style 'signature' is of a characteristic custom form as mentioned previously.

The most likely embodiment of this marking method of this invention is as a secure form of uniquely numbering diffractive optical devices as the advantage of laser marking is that the scanning laser has to write each mark individually so making it useful consecutive or unique marking applications. This is particularly because this laser marking technique is most competitive for unique marking where the laser mark technique is particularly advantageous for producing secure marks containing a characteristic signature within the laser mark line pattern of score markings and demetallisation visible in reflection viewing or transmissively visible perforations for both unique visual appearance of the mark and a highly characteristic detail line-width pattern along the font or line pattern that can be made custom to, for example, a particular application. Thus the laser mark can be customised easily to provide a highly secure detailed microscopic signature envisaged as particular repetitive variations encoded over ideally small repetitive distances over the line pattern to provide an additional second line security feature. It is also envisaged that for example for a particular application the font/line-writing pattern could be adjusted to provide for example unique sequential numbers when viewed in reflection for normal viewing with a secondary fixed or different less visible pattern viewable in the transmissive image to provide an additional level of authentication and encoding as required and to provide additional secure verification.

Another useful embodiment of the invention is envisaged for securitising and patterning diffractive foil on security documents. In this case one could envisage a fixed pattern being written in the foil, spanning both foil and paper for example in the form of a reflective guilloche pattern applied to a banknote patch or foil matched to a fixed transmissive pattern of perforations or variable cut depth. A particularly useful application would be for the secure writing of a serial number or code on a security document such as for example a banknote where for example part or all of the a serial number could be repeated as a laser marked pattern on the hot stamping foil and for example part variable patterning could be combined within part of a fixed patterning. Other possibilities will be evident to those knowledgeable in the field and are included herein by reference.

Another advantage of this new laser marking invention is that it requires very special and unusual laser apparatus to write the pattern and in particular to record the variable reflective and transmissive patterns. This makes reverse engineering or reproduction of this type of personalisation or numbering even for those skilled in the art prohibitively difficult requiring both the correct sophisticated equipment and the correct custom writing code and font and materials, all of which maintain a delicate balance that can alter the marks appearance.

This invention is therefore a new type of extremely secure marking system in a preferred embodiment for optically variable devices where the holographic or diffractive structure replays an optically variable- image for visual authentication, which image has been potentially uniquely and indelibly marked with an additional image or number such that a first viewable image is observed in reflected light and such that a second different image is observed in transmitted light. In another embodiment the device may display to view simply a reflective marking, but that marking would have potentially a unique form caused by variations in cut depth in for example a paper substrate and variations in line width of metal removal in a metallised label to produce a characteristic form of novel line width variation and reflectivity variation and apparent line-weight. In a preferred embodiment the marking style would contain both a reflective encoded characteristic image and a transmissive characteristic image.

This system is significantly more secure and difficult to counterfeit or remanufacture than the previous systems whilst being typically an integrated part of the security image and resistant to alteration or removal. The new device is also significantly more complex to produce than previous devices and requires much more sophisticated techniques for manufacture.

In another embodiment of this invention, an optical security label consists of a diffractive surface relief structure consisting of a diffractive structure comprising a discrete region which generates in response to white light illumination a holographic or diffractive security image by the process of diffraction of light for visual authentication, and the device further comprising a variable data or image element consisting of an indelible pattern of inscribed areas where the reflector has been removed and perforations where both the reflector and the substrate have been removed, which forms under white light illumination a first visual image or data message when observed by reflected light, and which forms a second visual image or data message when viewed with transmitted light. These images could consist of alphanumeric characters or other graphical indicia, or a continuous tone image.

In one embodiment the first reflection image will consist of a variable piece of data or number whilst the second transmission image will consist of a characteristic pattern or second code—possibly fixed whilst the primary code varies.

In a preferred embodiment the data point positions of the second image lie along the track of the first image and so are indistinguishable in reflected light.

In another embodiment the reflected and transmitted images further comprise a pattern of variable levels of inscribing where the depth of inscribing varies along the track and also the size of perforation varies along the track (by varying laser power/speed) with a preferred embodiment in which the variable pattern is repetitive to provide a characteristic signature of this marking both as further identification against counterfeit and also to provide a pattern to make alteration more difficult.

In a further embodiment the marking can extend over both the metallised optically variable device and the adjacent paper substrate next to provide a preferably variable pattern of inscribing there, to include the formation of a variable surface relief as depth of inscribing and ablation varied and to include variable discolouration due to heating effects and potentially. In an extension of this the laser mark power can be adjusted and varied rapidly to profile the plastic or paper surface, potentially to provide a tactile effect.

A particular preferred embodiment is a hot stamped diffractive device, applied to a low weight paper presented in the form of a label with a potentially unique laser marked number encoded in the foil to potentially uniquely identify the label. A particularly suitable form of paper is low weight paper as this optimises production throughput for the system as the paper requires less energy and dwell time for laser vaporisation for perforation and also offers good tamper evidence—useful paper weights are around 30 gram per square meter, in the range 15 to 60 gram per square meter. Such a label would usefully display both a reflective visual laser marked number in the foil and also a separate pattern visible in transmission and such a device is particularly useful for affixing to transparent substrates, for example in bottling applications for security and authentication labelling where the label number can be authenticated in both reflection and transmission.

Another useful embodiment of this invention would be the case where the perforation technique is used to provide a separately removable area within the original label. For example, if the laser mark technique is used to continuously cut out a shape from the main labels, this shape will not to be removed when the waste is stripped from the label matrix but after the label has been adhered to a substrate will evidence tamper and removal of the original label by being left on the substrate even if tamper succeeds in removing the original label. This will therefore render the original label very obviously incomplete for reuse.

Additionally an interior cut out label could also be used to produce one main label for adherence to verify a document or article of value plus a secondary label, potentially in some custom shape (e.g. number interior) relating uniquely to the first label to be used and affixed for record or additional verification purposes.

It would also be possible using a variable perforation technique to increase the tamper evidence of certain areas of a label selectively, for example to leave a bar coded area clear for good readability and yet to increase the tamper evidence of the diffractive device to ensure its destruction removal or reuse attempted.

By the term diffractive surface relief structure we mean an embossed holographic or diffractive structure as known in the art where the surface relief pattern is embossed into a substrate or embossing lacquer typically to form a label, hot foil or other form of diffractive device embodiment as known in the art. Usually such surface relief structures are vacuum coated with a metal such as aluminium to provide an efficient reflector an to enhance the effect, but within the scope of this invention we also allow for the use of different metals of different reflectivity, partially transmitting and partially reflecting devise and devices substantially transparent coated with for example inorganic layer such as zinc sulphide or similar for use as data protection overlays typically.

In this invention we refer to diffractive and metallised optical structures as being the preferred optical security device to be marked but also wish to extend this description and the scope of this invention to cover alternative forms of optical security devices operating on the known principles of optical thin film interference effects consisting of either a stack of dielectric layers or a combination of metal layers and dielectric spacer layers.

By the term diffractive structure we refer to the surface relief structure of this device which generates its diffracted image by a process of diffraction of light and is typically manufactured by a holographic or direct write process as known in the art. The structures could be holographic as known in the field or pure diffractive structures such as a "kinegram" or a computer calculated and direct written diffractive structure recorded by for example an electron beam lithography system such as the device known as an "Exelgram'.

The method of interrogation and authentication of these labels is envisaged to ensure that it is easy to authenticate the genuineness of both diffractive device and laser marked code. Thus, under typical conditions one would anticipate interrogation and authentication by an inspector verifying the structure by illuminating it and viewing both the diffracted image to authenticate the diffractive or holographic security device and then viewing the laser marked pattern or number in initially reflected light to verify this portion, and if required and applicable in transmitted light also to verify the second transmitted code or image, as it a key object of this invention over prior systems to make the authenticity of the number easy to ascertain. The primary authentication technique is envisaged as visual, but in the case of doubt it is envisaged that the inspector would view secondary diffractive optical security images and would also use microscopy based laboratory techniques to verify the detail small scale characteristics pattern built into the write pattern of the laser mark.

This invention will now be illustrated with the help of schematic drawings to explain preferred embodiments and potential manufacturing methods.

Figure 1:
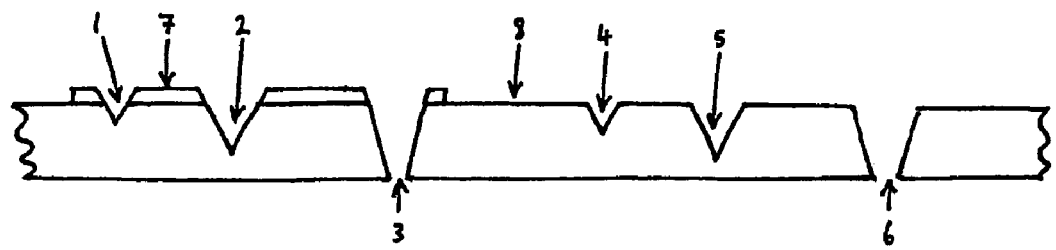
FIG. 1 illustrates several examples of the form of cut profile that can be achieved by laser ablation of different substrates showing variable line width capability for both demetallisation of foil and paper and also illustrates the perforation method.

The figures and preferred embodiments are now explained in more detail:

FIG. 1 illustrates schematically (cut areas relatively enlarged for clarity) the form of cut profile (1,2,3,4,5,6) that can be achieved by laser ablation of different substrates (hot stamped diffractive device, 7 and paper, 8) showing variable line width capability for both demetallisation of foil (1,2,3), scoring and perforation of underlying substrate (2,3) (e.g. plastic or paper) and variable depth scoring (4,5) of paper or other substrate and perforation (6). The amount of material removed by vaporisation by the focussed laser beam is controlled by adjusting any or all of laser power, operating wavelength, scan speed and dwell time at any spot, spot focus size and material type. The profile and depth of cut can then be adjusted to provide the shown cut profiles varying between several types: On metallised holograms metal removal to indelibly mark and the option to produce an indelible mark of variable line-width and hence reflectivity and weight and the additional option where required to perforate either plastic or paper base carrier to produce either second pattern within perforations viewed in transmission or to cut out completely a second defined shape; on non metallised generally areas of paper carrier the ability and option to remove part of depth of material to score through to mark the material to a variable depth or to perforate completely to provide a transmissive pattern. On thicker paper bases a variable cut depth will enable profiling of the surface for additional optical or tactile effects.

Figure 2:
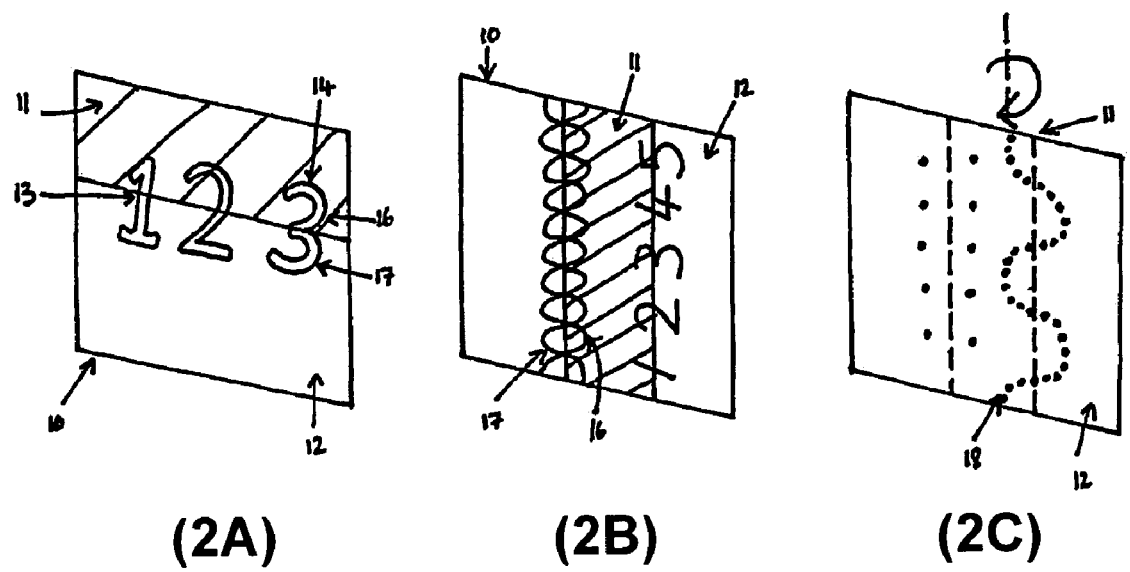
FIG. 2 illustrates a security label consisting of a diffractive device hot foiled onto a paper substrate illustrating how the laser mark may be used to mark a number crossing over areas of both diffractive foil and paper to secure number and document against tamper, foil removal and reuse or alteration.

FIG. 2 illustrates a security label or document (10) application consisting of a diffractive device (11) hot foiled onto a paper substrate (12) illustrating how the laser mark (13) may be used to mark a number (14) crossing over (15) areas of both diffractive foil (16) and paper (17) to secure number and label document against tamper, foil removal and reuse or alteration. FIG. 2A show a number item, where the number marks both diffractive area and paper area. FIG. 2B shows a striped portion of a document showing a guilloche type pattern inscribed over both foil and paper areas on one side with a number on the other side of the foil. FIG. 2C illustrates the view of the stripe area of FIG. 2C reversed and how a transmissive message would appear (18), showing how selectively perforated areas of the laser marked pattern can display perforated images completely distinct from the reflectively marked patterns for additional security. Any of the reflective or transmissive markings of FIG. 1 may be used with this embodiment securely and indelibly marking both diffractive device and securely tying diffractive device to paper. This could also be used on a document, for example instead of a number a guilloche pattern defining the edge of a foil on a secure document.

Figure 3:
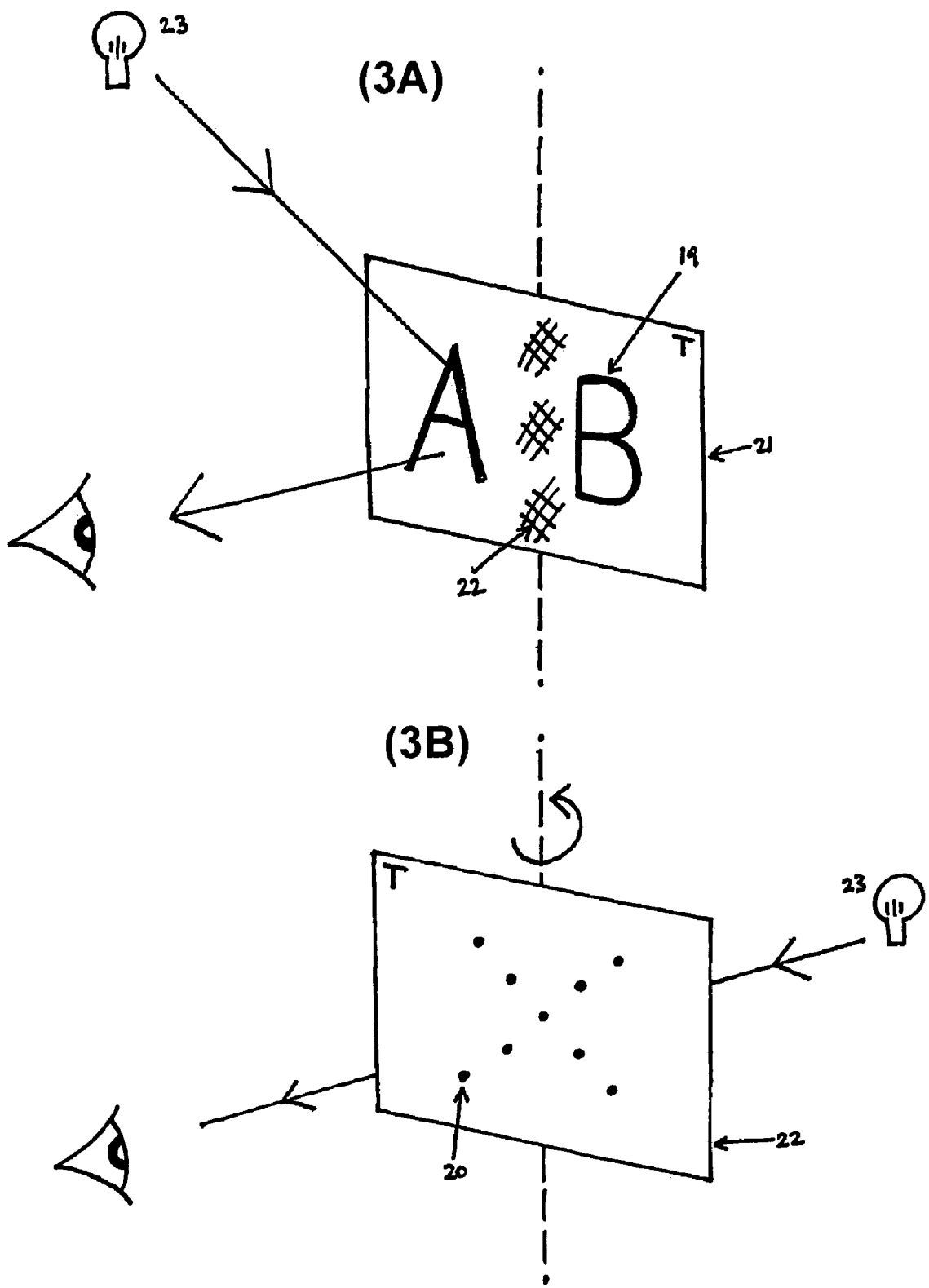
FIG. 3 illustrates a form of the device showing how a viewer would see a reflective insignia or number and also a transmissive message.

FIG. 3 illustrates a form of the device showing how a viewer would see a reflective insignia (19) at the or number and also a transmissive message (20) inscribed into a metallised diffractive optical variable device (21) displaying an image in reflected light for visual authentication (22) viewed simultaneously with the laser inscribed reflective insignia (19). FIG. 3A shows the viewing of the device in reflective mode when illuminated by light from a source (23) which reconstructs diffractive image (22) displaying laser inscribed insignia or number, etc. FIG. 3B illustrates the situation when the device is viewed in transmitted light, when illuminated and viewed from opposite sides showing how selective perforations within the original reflective logo can be used to provide an entirely different transmissive message for additional security and verification value. The reflective and transmissive images will both be formed using combinations of cut types as described in FIG. 1.

Figure 4:
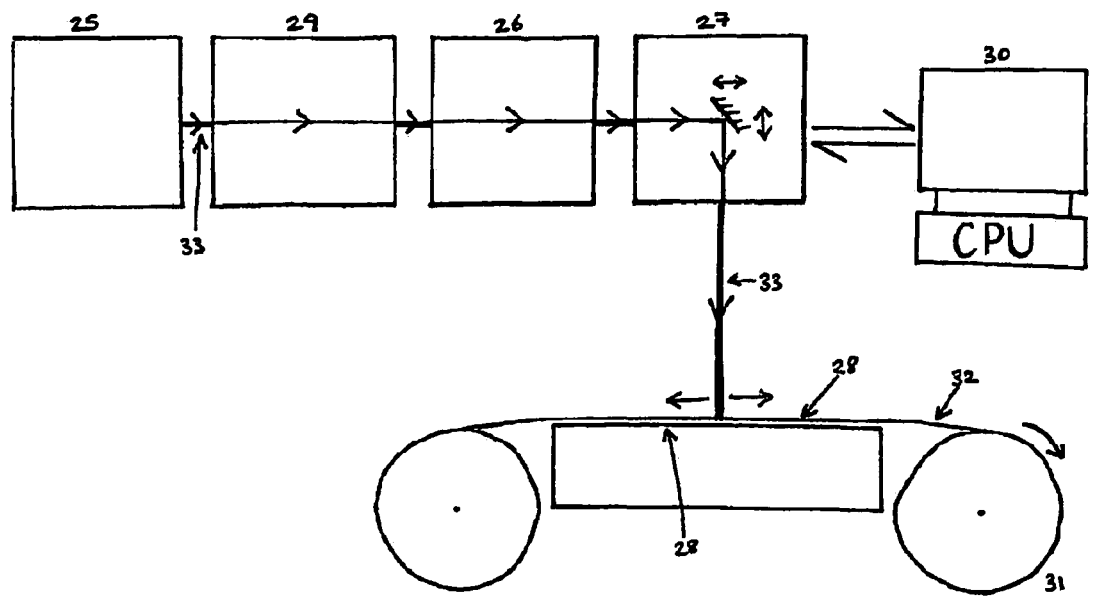
FIG. 4 illustrates in schematic terms how laser marking apparatus would be arranged for this application.

FIG. 4 illustrates in schematic terms how one form of laser marking apparatus would be arranged to manufacture this invention. This apparatus would consist of a laser (25)—a useful type of laser for this application would be a gaseous carbon dioxide laser operating at 10.6 microns—optical focussing apparatus (26) for focussing the laser beam (33) down to a small spot size to increase the intensity to a level appropriate for vaporisation, scanning apparatus (27) to transverse the laser beam across the substrate target area (28), a fast shutter mechanism (29) for switching the beams and electronic and computer control apparatus (30) for controlling write speed, scan speed and spot positions. The apparatus also contains a mechanism (31) for advancing the substrate (32) to write the next frame, although it will be appreciated to those skilled in the art that the substrate could be continually advanced in a web to web process with suitable adjustments to the laser scanning mechanism and controls. A particularly useful form of this apparatus is where the laser scans at fixed power and a software graphics interface controls the writing pattern directly from a computer graphic design package enabling the precise cut shape and detail profiling to be controlled by controlling the graphic input to the unit and in particular in numbering applications to use a custom numerical and alphabetical font created specially for a particular application to control detailed cut shapes and repetitive patterns for encoding and perforating. A manufacturer of CO2 lasers operating at 10.6 micron suitable and preferred for this device would be Coherent Limited. Other types of lasers that could be used for this and are available commercially include gaseous lasers, CO2, He-NE, solid state lasers such as Nd-Yag, Ruby, semi-conductor lasers and many other forms of commercially available systems depending on the absorption characteristics of the substrate.

Figure 5:
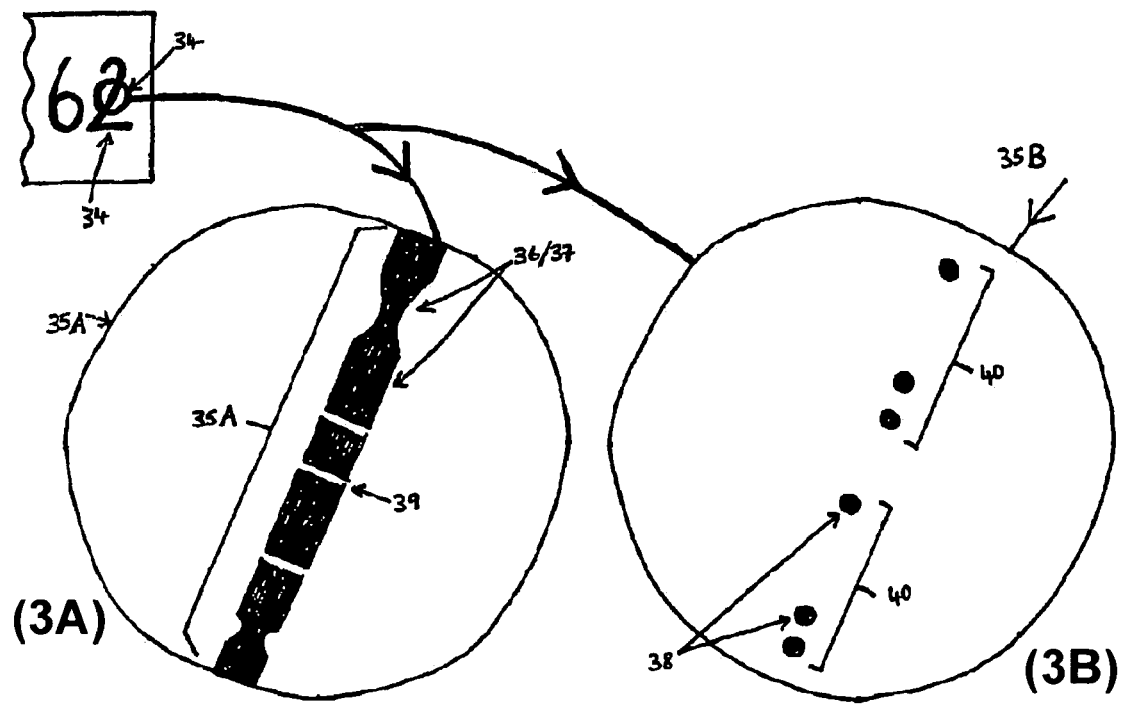
FIG. 5 illustrates schematically a small section of a font line drawn with a customised 'laser signature' showing how the line marking pattern can vary along a font repetitively to provide a secure and characteristic signature on a microscopic level for the device.

FIG. 5 illustrates schematically a small magnified section of a font line (34) drawn with a customised 'laser signature' (35) shown in both reflective view (35A, FIG. 5A and 35B, FIG. 5B), essentially a repetitive periodic variation of the cut pattern and depth to provide a microscopic encoding for that particular form of mark useful for subsequent verification. One repeat is shown for reflective pattern (35A) which has been designed to match to 2 repeats (35B, 40) of transmissive pattern. This encoding can be any form or combination of variation in cut depth (36), width of metal track removed (37), perforations (38) and pattern spaces (39) in scoring lines. The intention is that in an consecutively or uniquely marked set of items although the alpha numeric graphics will vary between items each item will have been written with a potentially customised font, customised not just to shape of letter but also to include a repetitive variation of the line form as an additional encoding mechanism. This figure shows how the line marking pattern can vary along a font repetitively to provide a secure and characteristic signature on a microscopic level for the device.

The invention claimed is:

1. An optical structure comprising:
   a substratum including an optically variable portion;
   at least one reflective graphical indicia laser-inscribed at least in the surface of the substratum, wherein the optically variable portion and the at least one reflective graphical indicia are arranged to offer a first optically variable image and a second reflective image visible via reflected light, respectively; and
   at least one laser-inscribed transmissive graphical indicia formed in the substratum and arranged to offer a transmissive image visible via light transmitted through the structure, the at least one transmissive graphical indicia being arranged to be substantially coincident with the at least one reflective graphical indicia,
   wherein the transmissive graphical indicia is formed by local and variable variations in depth of laser inscription through the substrate in localized regions and characterized in that the substrate is thin enough to allow for laser perforation therethrough.

2. An optical structure as claimed in claim 1, wherein the optically variable portion comprises at least one of a diffractive optical device or a thin film device.

3. An optical structure as claimed in claim 1, wherein the transmissive image is different from the second inscribed reflective image.

4. An optical structure as claimed in claim 1, wherein a dimension of the at least one transmissive graphical indicia is varied.

5. An optical structure as claimed in claim 1, wherein the at least one transmissive graphical indicia is arranged to be visually indistinguishable from the at least one reflective graphical indicia.

6. An optical structure as claimed in claim 1, wherein the at least one transmissive graphical indicia is arranged to form a line of weakness in the substratum such that a portion of the substratum can be separated from the whole.

7. An optical structure as claimed in claim 6, wherein a portion of the substratum is arranged to remain adhered to a product if the optical structure is tampered with.

8. An optical structure as claimed in claim 1, wherein the at least one transmissive graphical indicia is unique to each said optical structure or fixed at least for a batch of said optical structures.

9. An optical structure as claimed in claim 1, wherein the at least one reflective graphical indicia is unique to each said optical structure.

10. An optical structure as claimed in claim 1 and comprising an optical security structure wherein the first and second images comprise security images.

11. An optical structure as claimed in claim 1, wherein a characteristic of the at least one reflective graphical indicia is varied.

12. An optical structure as claimed in claim 11, wherein the characteristic comprises the width and/or depth of the at least one reflective graphical indicia.

13. An optical structure as claimed in claim 11, wherein the at least one graphical indicia includes a pattern of varying widths and/or depths.

14. An optical structure as claimed in claim 13, wherein the pattern comprises a characteristic repeated pattern.

15. An optical structure as claimed in claim 13, wherein the pattern includes microscopic details.

16. An optical structure as claimed in claim 1, further comprising variable surface relief.

17. An optical structure as claimed in claim 1, further including a controllably variable discoloration of the substratum along at least part of, or in the proximity of, the at least one reflective graphical indicia.

18. An optical structure as claimed in claim 1, wherein the substratum comprises a low weight paper.

19. An optical structure as claimed in claim 18, wherein the low weight paper is in the range of 15 to 60 grams per square meter.

20. An optical structure as claimed in claim 1, wherein the substratum comprises a plastics material.

21. An optical structure as claimed in claim 1, further comprising a plurality of parts, said plurality of parts arranged such that at least a first part can be attached to a product and at least a second part can be retained for verification purposes.

22. An optical structure as claimed in claim 21, wherein the plurality of parts are arranged to form a unique optical structure.

23. An optical structure as claimed in claim 1, wherein the at least one reflective graphical indicia is arranged to extend across an edge of the optically variable portion from a first region where the optically variable portion is present to a second region where the optically variable portion is absent.

24. An optical structure as claimed in claim 23, wherein the at least one reflective graphical indicia extends along substantially all of at least one edge of the optically variable portion.

25. An optical structure as claimed in claim 1, wherein the at least one reflective graphical indicia exhibits a surface undulation pattern arranged to offer a tactile characteristic.

26. An optical structure as claimed in claim 25, wherein the surface undulation pattern is arranged to produce an additional image visible in grazing incidence reflected light.

27. An optical structure as claimed in claim 26, wherein the additional image is located with but arranged to offer a different image from the second reflective image offered by the at least one reflective graphical indicia.

28. An optical structure as claimed in claim 1 wherein the at least one laser-inscribed transmissive graphical indicia comprises a set of transmissive perforations.

29. A method of forming an optical structure comprising the steps of:
   applying an optically variable device to a portion of a substratum;
   laser-inscribing at least one inscribed graphical indicia at least in the surface of the substratum, wherein the optically variable device and the at least one inscribed graphical indicia are arranged to offer first and second images visible via reflected light; and
   forming a laser-inscribed transmissive graphical indicia in the substratum, said transmissive graphical indicia arranged to offer a further transmissive image visible via light transmitted through the optical structure, the at least one transmissive graphical indicia being arranged to be substantially coincident with the at least one inscribed graphical indicia,
   wherein the transmissive graphical indicia is formed by local and variable variations in depth of laser inscription through the substrate in localized regions and characterized in that the substrate is thin enough to allow for laser perforation therethrough.

30. A method as claimed in claim 29, wherein the optically variable device comprises at least one of a diffractive optical device or a thin film device.

31. A method as claimed in claim 29 employing laser ablation for forming the at least one inscribed indicia with a laser beam provided by a laser.

32. A method as claimed in claim 31, including the additional step of controlling any one of, or any combination of, the scanning rate, the intensity of the laser or the width of the laser beam to control the width of cut and/or depth of cut of the at least one inscribed graphical indicia.

33. A method as claimed in claim 31, including the additional step of controlling any one of, or any combination of, the scanning rate, the intensity of the laser or the width of the laser beam, to produce a pattern in microstructure of the substratum.

34. A method as claimed in claim 33, wherein the pattern comprises a characteristic repeated pattern.

35. A method as claimed in claim 31, including the additional step of utilizing a computer program to control any one of, or any combination of, scanning rate, the width of the laser beam and the intensity of the laser.

36. A method as claimed in claim 31, including the step of maintaining intensity and width of the laser beam constant and employing a custom font introduced via a graphical interface to produce a custom pattern.

37. A method as claimed in claim 29, wherein the at least one inscribed graphical indicia comprises a customized font.

38. A method as claimed in claim 29, wherein the depth of at least a portion of the at least one inscribed graphical indicia is controlled so as to form a transmissive graphical indicia.

39. A method as claimed in claim 29, wherein the inscribing of the at least one inscribed graphical indicia is arranged to provide a surface undulation pattern arranged to offer a tactile characteristic.

40. A method as claimed in claim 39, wherein the tactile characteristic is varied between different styles of inscribed graphical indicia.

41. A method as claimed in claim 29 wherein the laser-inscribed transmissive graphical indicia comprises a set of transmissive perforations.

* * * * *